(12) United States Patent
Yen (10) Patent No.: US 11,742,962 B2
(45) Date of Patent: Aug. 29, 2023

(54) SYSTEMS AND METHODS FOR MONITORING ANTENNA ARRAYS

(71) Applicant: Quanta Computer Inc., Taoyuan (TW)

(72) Inventor: Chi-Sen Yen, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 0 days.

(21) Appl. No.: 17/473,508

(22) Filed: Sep. 13, 2021

(65) Prior Publication Data

US 2023/0084949 A1 Mar. 16, 2023

(51) Int. Cl.
| | |
|---|---|
| *G08B 21/18* | (2006.01) |
| *H04B 17/17* | (2015.01) |
| *H04N 7/18* | (2006.01) |
| *G08B 17/12* | (2006.01) |
| *H01Q 3/08* | (2006.01) |
| *G06V 20/52* | (2022.01) |
| *H04N 23/57* | (2023.01) |

(52) U.S. Cl.
CPC ............. *H04B 17/17* (2015.01); *G06V 20/52* (2022.01); *G08B 17/125* (2013.01); *G08B 21/182* (2013.01); *H01Q 3/08* (2013.01); *H04N 7/181* (2013.01); *H04N 23/57* (2023.01)

(58) Field of Classification Search
CPC ....... G06V 20/50; G06V 20/52; G08B 21/182
See application file for complete search history.

(56) References Cited

U.S. PATENT DOCUMENTS

| | | | | |
|---|---|---|---|---|
| 10,395,498 | B2 * | 8/2019 | Mills | G06V 20/52 |
| 2002/0186878 | A1 * | 12/2002 | Hoon | G06T 7/586 |
| | | | | 382/154 |
| 2017/0045623 | A1 * | 2/2017 | Zlogar | G01S 3/14 |
| 2017/0270612 | A1 | 9/2017 | Howe et al. | |
| 2019/0102874 | A1 * | 4/2019 | Goja | G06T 7/74 |
| 2020/0012859 | A1 * | 1/2020 | Zheng | G06K 9/6284 |

FOREIGN PATENT DOCUMENTS

CN 103733234 B 5/2017

* cited by examiner

*Primary Examiner* — Benyam Haile
(74) *Attorney, Agent, or Firm* — Nixon Peabody LLP (57) ABSTRACT

A method of monitoring an antenna array comprises generating first image data at a first time. The first image data is reproducible as a first image of an antenna array unit. The method further comprises generating second image data at a second time. The second image data is reproducible as a second image of the antenna array unit. The method further comprises comparing the first image data and the second image data. The method further comprises transmitting an alert that is indicative of the presence of at least one with the antenna array unit at the second time. The alert is transmitted in response to the comparison between the first image data and the second image data indicating the presence of the at least one fault with the antenna array unit at the second time.

17 Claims, 4 Drawing Sheets

SYSTEMS AND METHODS FOR MONITORING ANTENNA ARRAYS

TECHNICAL FIELD

The present invention relates generally to mobile networks, and more specifically, to systems and methods of monitoring antenna arrays of mobile networks.

BACKGROUND

Mobile networks, such as 4G networks and 5G networks, utilize complex antenna arrays mounted on large towers. Because the antenna arrays are direction-specific, the signal quality of the antenna arrays can be affected by various faults with the antenna arrays, such as physical damage, the presence of animals, movement of the antenna arrays, etc. Thus, systems and methods for monitoring and identifying faults with antenna arrays is needed.

SUMMARY OF THE INVENTION

The term implementation and like terms, e.g., embodiment, configuration, aspect, example, and option, are intended to refer broadly to all of the subject matter of this disclosure and the claims below. Statements containing these terms should be understood not to limit the subject matter described herein or to limit the meaning or scope of the claims below. Implementations of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a method of monitoring an antenna array comprises generating first image data at a first time. The first image data is reproducible as a first image of an antenna array unit. The method further comprises generating second image data at a second time. The second image data is reproducible as a second image of the antenna array unit. The method further comprises comparing the first image data and the second image data. The method further comprises transmitting an alert that is indicative of the presence of at least one with the antenna array unit at the second time. The alert is transmitted in response to the comparison between the first image data and the second image data indicating the presence of the at least one fault with the antenna array unit at the second time.

In some implementations, the fault includes movement of the antenna array unit away from a desired location, physical damage to the antenna array unit, an elevated heat level at the antenna array unit, a presence of an animal near the antenna array unit, or any combination thereof.

In some implementations, the movement of the antenna array unit includes vertical movement of the antenna array unit, horizontal movement of the antenna array unit, rotational movement of the antenna array unit, or any combination thereof.

In some implementations, the antenna array unit includes a housing, one or more antennas, and one or more cables. The one or more antennas are disposed at least partially within the housing. The one or more cables are coupled to the housing. The physical damage to the antenna array unit includes physical damage to the housing, physical damage to the one or more cables, or both.

In some implementations, the physical damage to the antenna array unit includes a puncture in the housing of the antenna array unit, a puncture in at least one of the one or more cables, a severing of at least one of the one or more cables, a disconnection of at least one of the one or more cables from the housing, fire damage to the housing, fire damage to at least one of the one or more cables, or any combination thereof.

In some implementations, the elevated heat level at the antenna array unit is indicative of a fire at the antenna array unit.

In some implementations, the first image data and the second image data are generated by a high-resolution camera, a thermal camera, or both a high-resolution camera and a thermal camera.

In some implementations, the alert includes (i) information associated with the at least one fault and (ii) information associated with an identity of the antenna array unit.

In some implementations, comparing the first image data and the second image data includes generating the first image of the antenna array unit from the first image data, generating the second image of the antenna array unit from the second image data, and identifying one or more differences between the first image and the second image. The one or more differences are indicative of the presence of the at least one fault with the antenna array unit at the second time.

In some implementations, identifying the one or more differences between the first image and the second image includes comparing each pixel of a plurality of pixels in the second image with a corresponding pixel of a plurality of pixels in the first image. Identifying the one or more differences between the first image and the second image further includes determining a percentage of the plurality of pixels in the second image that are different than the corresponding pixel of the plurality of pixels in the first image. Identifying the one or more differences between the first image and the second image further includes analyzing at least the second image to identify the one or more differences between the first image and the second image, in response to the percentage of different pixels satisfying a threshold percentage.

In some implementations, the threshold percentage is a maximum number of the plurality of pixels in the second image that are different than the corresponding pixel of the plurality of pixels in the first image, and the percentage satisfies the threshold percentage if the percentage is greater than or equal to the threshold percentage.

In some implementations, the alert is transmitted in response to the identified one or more differences indicating the presence of the at least one fault with the antenna array.

In some implementations, the method further comprises discarding the second image in response to the identified one or more differences not indicating the presence of the at least one fault with the antenna array.

In some implementations, the method further comprises discarding the second image in response to the percentage of different pixels not satisfying the threshold percentage.

In some implementations, the method further comprises generating third image data at a third time. The third image data is reproducible as a third image of the antenna array unit. The third image data is generated in response to the comparison between the first image data and the second image data not indicating the presence of the at least one fault with the antenna array unit. The method further comprises comparing the first image data and the third image data. The method further comprises transmitting an alert indicative of the presence of the at least one fault with the antenna array unit at the third time. The alert is transmitted in response to the comparison between the first image data and the third image data indicating the presence of the at least one fault with the antenna array unit at the third time.

In some implementations, a difference in time between (i) the first time and the second time, (ii) the second time and the third time, or (iii) both (i) and (ii), is 30 seconds, 1 minute, 5 minutes, 10 minutes, 30 minutes, 1 hour, 2 hours, 6 hours, 12 hours, or 1 day.

According to certain aspects of the present disclosure, a system for monitoring an antenna array comprises one or more camera modules. Each camera module is configured to be coupled to a housing of an antenna array unit of the antenna array. At least one of the camera modules include one or more image sensors, a communications interface, a memory device, and a control system. The one or image sensors includes a high-resolution camera, a thermal camera, or both a high-resolution camera and a thermal camera. The memory device has stored thereon machine-readable instructions. The control system includes one or more processors that are configured to execute the machine-readable instructions to execute a method. The method includes generating, via the one or more image sensors at a first time, first image data reproducible as a first image of the antenna array unit. The method further includes generating, via the one or more image sensors at a second time after the first time, second image data reproducible as a second image of the antenna array unit. The method further includes comparing, via the control system, the first image data and the second image data. The method further includes transmitting, via the communications interface, an alert that is indicative of the presence of at least one with the antenna array unit at the second time. The alert is transmitted in response to the comparison between the first image data and the second image data indicating the presence of the at least one fault with the antenna array unit at the second time.

In some implementations, the one or more camera modules includes a first camera module and a second camera module. The first camera module is configured to be coupled to a first end of a surface of the antenna array unit, and the second camera module is configured to be coupled to a second opposing end of the surface of the antenna array unit. The second end of the surface of the antenna array unit is within a field of view of the one or more image sensors of the first camera module. The first end of the surface of the antenna array unit is within a field of view of the one or more image sensors of the second camera module.

In some implementations, the one or more camera modules includes a first camera module and a second camera module. The first camera module is configured to be coupled to a first surface of a first antenna array unit. A first surface of a second antenna array unit is within a field of view of the one or more image sensors of the first camera module. The second camera module is configured to be coupled to a second surface of the first antenna array unit. The second surface of the first antenna array unit is within the field of view of the one or more image sensors of the second camera module.

In some implementations, the first surface of the first antenna array unit is a side surface, the second surface of the first antenna array unit is a top surface or a bottom surface, and the first surface of the second antenna array unit is a side surface that faces toward the side surface of the first antenna array unit.

The above summary is not intended to represent each implementation or every aspect of the present disclosure. Rather, the foregoing summary merely provides an example of some of the novel aspects and features set forth herein. The above features and advantages, and other features and advantages of the present disclosure, will be readily apparent from the following detailed description of representative implementations and modes for carrying out the present invention, when taken in connection with the accompanying drawings and the appended claims. Additional aspects of the disclosure will be apparent to those of ordinary skill in the art in view of the detailed description of various implementations, which is made with reference to the drawings, a brief description of which is provided below.

BRIEF DESCRIPTION OF THE DRAWINGS

The disclosure, and its advantages and drawings, will be better understood from the following description of representative implementations together with reference to the accompanying drawings. These drawings depict only representative implementations, and are therefore not to be considered as limitations on the scope of the various implementations or claims.

DETAILED DESCRIPTION

Mobile networks (such as 4G networks, 5G networks, etc.) are communication networks in which devices are wirelessly connected to the Internet and telephone networks using multiple antenna arrays. Often, each antenna array is mounted at the top of a large tower, sometimes referred to as a cell tower. The mobile network is divided into geographical areas referred to as cells, and devices within each cell are wirelessly connected to the network via the antenna arrays. The antenna arrays can be used to transmit and receive data in the form of radiofrequency (RF) signals. The antenna array at each cell tower generally includes one or more antenna array units. Each antenna array unit generally includes a housing, one or more antennas mounted within the housing, and one or more cables coupled to the housing that electrically connect the one or more antennas to any necessary electronic communications equipment at the cell tower. Because the antennas in each antenna array unit are direction-specific, the antenna array unit generally must be in a desired position so that the antenna array at the cell tower works properly. Physical damage to the antenna array units can also negatively impact the performance of the antenna array units, as can the presence of animals (e.g., birds, insects, birds' nests, insect hives or colonies, etc.).

Disclosed herein are systems and methods for monitoring antenna array units and determining when faults with the antenna array units occur.

Various implementations are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various implementations disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 1:
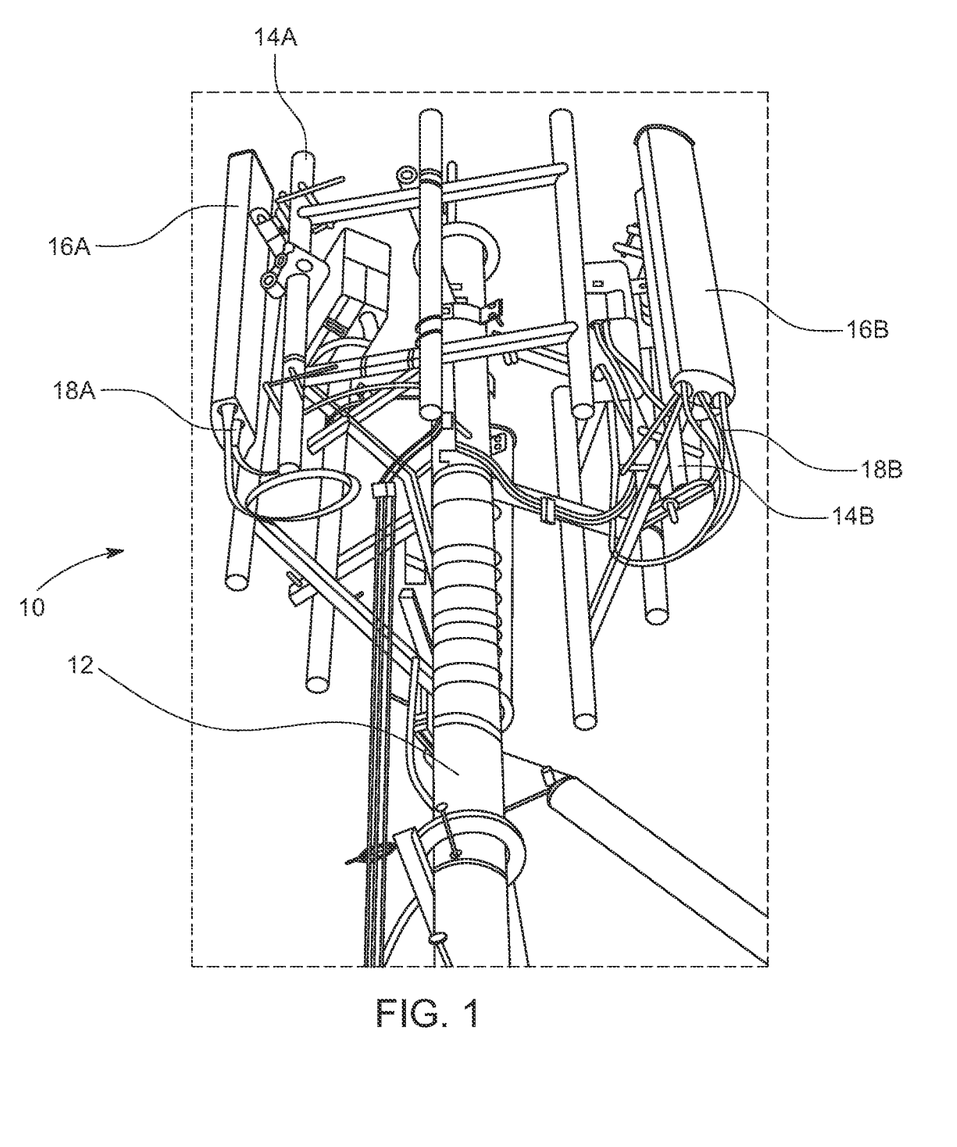
FIG. 1 is a perspective view showing an antenna array mounted on a cell tower, according to certain aspects of the present disclosure.

FIG. 1 illustrates an example cell tower 10 that can form part of a mobile network. The cell tower 10 includes a generally vertical pole 12; support structures 14A and 14B that are coupled to the pole 12; and antenna array units 16A and 16B that are coupled to the support structures 14A and 14B, respectively. The antenna array units 16A and 16B form an antenna array. Each of the antenna array units 16A and 16B is formed from a housing that has one or more antennas disposed therein. The housings may include additional electronic components disposed therein. Each of the antenna array units 16A and 16B also includes one or more cables coupled to the respective housings. FIG. 1 shows one or more cables 18A that are coupled to the housing of the antenna array unit 16A, and one or more cables 18B that are coupled to the housing of the antenna array unit 16B. When coupled to the housings, the cables 18A and 18B can be used to electrically connect components inside the housing (such as individual antennas or other electronic components) to other electronic components outside of the housing. These other electronic components could be located elsewhere at the top of the pole 12, anywhere along the height of the pole 12, at the base of the pole 12, or generally anywhere at or near the cell tower 10.

Figure 2:
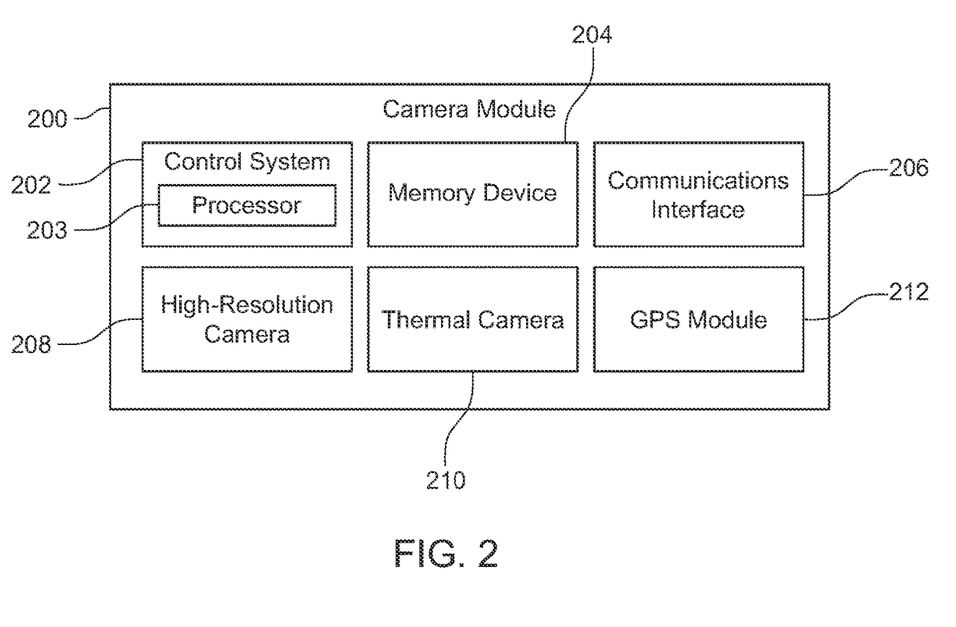
FIG. 2 is a block diagram of a camera module that can be used to monitor the antenna array of FIG. 1, according to certain aspects of the present disclosure.

FIG. 2 is a block diagram of a camera module 200 that can be used to monitor antenna array units of an antenna array, such as antenna array units 16A and 16B in FIG. 1. The camera module 200 includes a control system 202, one or more memory devices 204, a communications interface 206, a high-resolution camera 208, a thermal camera 210, and a global positioning system (GPS) module 212. The control system 202 includes one or more processors 203. The memory device 204 can store machine-readable instructions, which can be executed by the one or more processors 203 of the control system 202 to carry out various tasks related to monitoring and analyzed antenna array units. The communications interface 206 can include any combination of wired and wireless communications interfaces, which can be used to transmit various types of data and/or information to a variety of different locations (such as other camera modules, a central monitoring station or other monitoring entity, etc.).

The high-resolution camera 208 is configured to generate image data that can be reproduced as a high-resolution image of the area that the camera module 200 is monitoring (e.g., the area within the field of view of the high-resolution camera 208). The thermal camera 210 is configured to generate image data that is reproducible as a thermal image of the area that the camera module 200 is monitoring. The thermal image can indicate the temperature of different areas within the field of view of the thermal camera 210. The GPS module 212 is configured to receive data from one or more GPS satellites in order to determine the specific location of the GPS module 212, and consequently, the specific location of the antenna array unit to which the camera module 200 is coupled. Location information about the antenna array unit can be communicated to other locations (such as other camera modules, a central monitoring station or other monitoring entity, etc.) using the communications interface 206.

The camera module 200 can also include any other desired components. For example, the camera module 200 can generally include any electronic components used to execute tasks related to monitoring antenna array units. The camera module 200 can also include any physical components used to couple the camera module 200 to an antenna array unit, etc. Moreover, while the camera module 200 is shown in FIG. 2 as including the high-resolution camera 208, the thermal camera 210, and the GPS module 212, the camera module 200 can generally include any number of image sensors and/or other electronic components. For example, the camera module 200 could include only the high-resolution camera 208, only the thermal camera 210, or either or both in combination with other types of image sensors.

Figure 3:
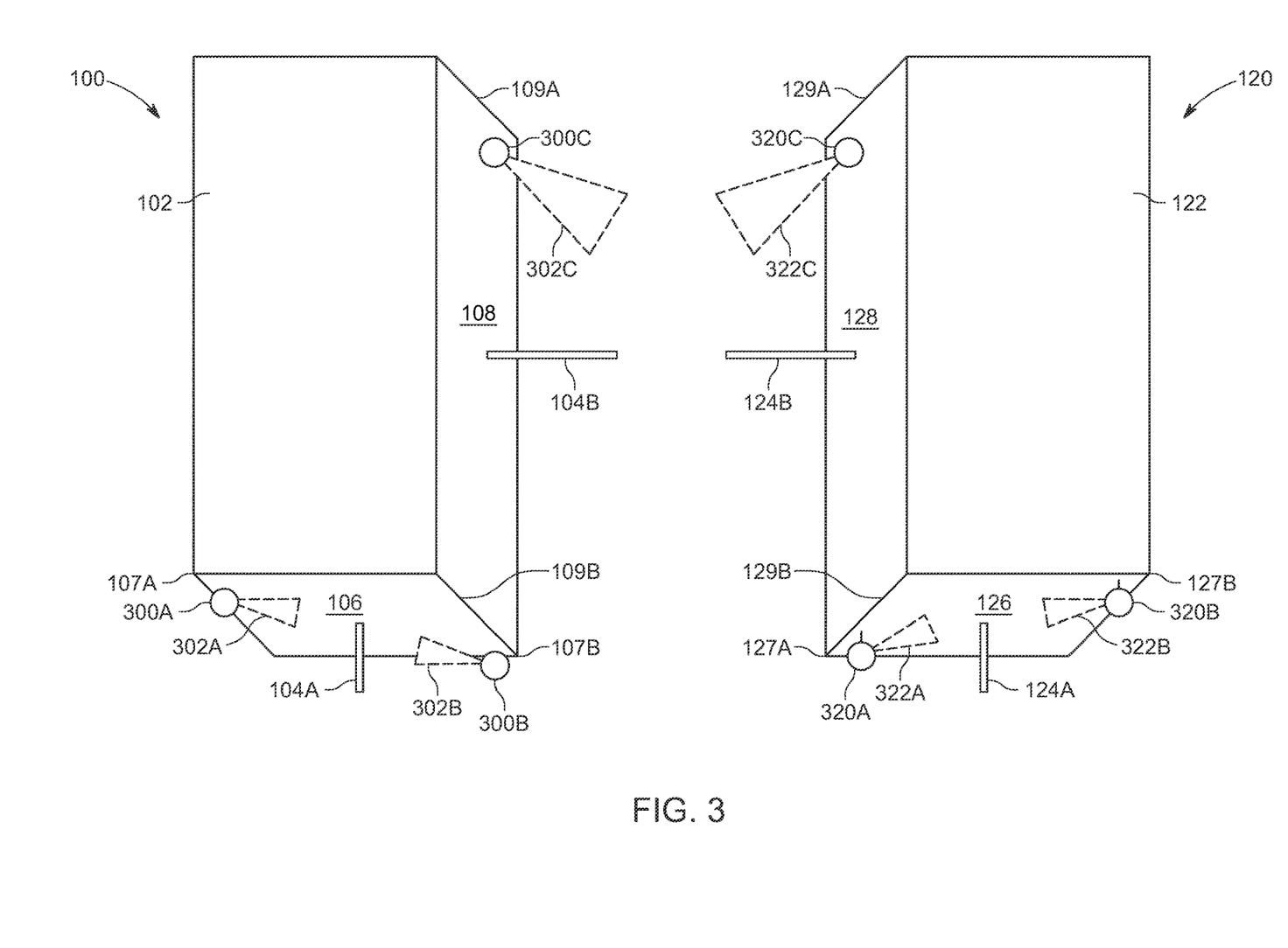
FIG. 3 is a perspective view showing two antenna array units of the antenna array of FIG. 1 being monitored by multiple of the camera modules of FIG. 2, according to certain aspects of the present disclosure.

FIG. 3 illustrates a system for monitoring two antenna array units 100 and 120 using a plurality of camera modules 300A-300C and 320A-320C. The antenna array units 100 and 120 may be the same as or similar to the antenna array units 16A and 16B of FIG. 1. Each of the plurality of camera modules 300A-300C and 320A-320C may be the same as or similar to the camera module 200 of FIG. 2. FIG. 3 shows the positions of the two antenna array units 100 and 120 when they are mounted in a cell tower as part of an antenna array. The antenna array unit 100 includes a housing 102 and cables 104A and 104B coupled to the housing 102. The housing 102 includes a bottom surface 106 and at least one side surface 108. The housing 102 will also generally include therein one or more antennas, as well as additional electronic equipment. The additional electronic component can include the remote radio unit (RRU), which is sometimes referred as the remote radio head (RRH). The RRU can be used to perform a variety of functions related to the operation of the antenna array unit, including transmit and receive functions, filtering, amplification, analog-to-digital conversion, digital-to-analog conversion, etc.

The cable 104A is coupled to the bottom surface 106, and the cable 104B is coupled to the side surface 108. One end of the cables 104A and 104B generally extends into the interior of the housing 102, and can be coupled to the antennas and/or any other electronic equipment located within the housing 102. The other end of the cables 104A and 104B can be positioned anywhere that may be necessary to connect the antennas or electronic equipment in the housing 102 with other electronic equipment at the cell tower. While only a single cable is shown coupled to each of the surfaces 106 and 108, the antenna array unit 100 may include any number of cables coupled to any number of surfaces. Further, while the housing 102 is shown as having a rectangular prism shape, the housing 102 can generally have any shape.

The antenna array unit 120 is generally identical to the antenna array unit 100, and includes a housing 122 and cables 124A and 124B coupled to the housing 122. The housing 122 includes a bottom surface 126 and at least one side surface 128. The housing 122 will also generally include therein one or more antennas, as well as additional electronic equipment (such as the RRU). The side surface 128 of the antenna array unit 120 faces toward the side surface 108 of the antenna array unit 100. The cable 124A is coupled to the bottom surface 126, and the cable 124B is coupled to the side surface 108. One end of the cables 124A and 124B generally extends into the interior of the housing 122, and can be coupled to the antennas and/or other electronic equipment located within the housing 122. The other end of the cables 124A and 124B can be positioned anywhere that may be necessary to connect the antennas or electronic equipment in the housing 122 with other electronic equipment at the cell tower. Similar to antenna array unit 100, while only a single cable is shown coupled to each surface 126 and 128, the antenna array unit 120 may include any number of cables coupled to any number of surfaces. Further, while the housing 122 is shown as having a rectangular prism shape, the housing 122 can generally have any shape, similar to housing 102.

The plurality of camera modules 300A-300C and 320A-320C can be coupled to the antenna array units 100 and 120 in order to monitor and detect changes in the status of each of the antenna array units 100 and 120. The camera modules 300A-300C and 320A-320C can be coupled to the antenna array units 100 and 120 such that the angle and distance of the image sensors relative to the antenna array units 100 and 120 can be adjusted. In the illustrated implementations, the camera modules 300A, 300B, and 300C are coupled to the housing 102 of antenna array unit 100, while the camera modules 320A, 320B, and 32C are coupled to the housing 122 of antenna array unit 120. The camera modules 300A-300C and 320A-320C can each include a variety of image sensors that can be used to generate image data that is reproducible as one or more images of variety of locations on the antenna array units 100 and 120.

As shown, the camera modules 300A and 300B are coupled to the bottom surface 106 of the housing 102, while the camera module 300C is coupled to the side surface 108 of the housing 102. Similarly, the camera modules 320A and 320C are coupled to the bottom surface 126 of the housing 122, while the camera module 320C is coupled to the side surface 128 of the housing 122. The camera modules 300A-300C and 320A-320C can be used to generate images of the antenna array units 100 and 120, including the housings 102 and 122, and any of the cables 104A, 104B, 124A, and 124B. The images can be analyzed in a variety of different manners to determine if the antenna array units 100 and 120 have any faults (such as physical damage to the housings or the cables, cables becoming uncoupled from their housings, etc.) that may need to be fixed (for example by a technician sent to the location of the antenna array units 100 and 120).

In the illustrated implementation, the camera modules 300A and 300B are configured to monitor the bottom surface 106 of the housing, and the cable 104A coupled to the bottom surface 106 of the housing 102. The camera module 300A is coupled to the housing 102 near a first corner 107A of the bottom surface 106. The camera module 300B is coupled to the housing 102 near a second corner 107B of the bottom surface 106. In the illustrated implementation, the bottom surface 106 has a generally rectangular or square shape, and the second corner 107B lies opposite the first corner 107A.

Each of the camera modules 300A-300C and 320A-320C has a field of view that is represented by a respective field of view cone 302A-302C and 322A-322C. The fields of view of the camera modules 300A-300C and 320A-320C are the physical area that the camera modules 300A-300C and 320A-320C can monitor (e.g., the field of view of a camera module represents the largest physical area that can be shown in an image produced using the image data generated by the image sensors of the camera module). In the illustrated implementations, the field of view of the camera modules 300A-300C and 320A-320C generally includes the portion of the antenna array units 100 and 120 that the camera modules 300A-300C and 320A-320C can monitor.

The field of view of the camera module 300A is shown by a field of view cone 302A, while the field of view of the camera module 300B is shown by a field of view cone 302B. The field of view cone 302A extends from the camera module 300A at the first corner 107A of the bottom surface 106, and is aimed toward the camera module 300B and the second corner 107B of the bottom surface 106. Thus, the image sensors in the camera module 300A can be used to generate image data that is reproducible as an image of at least a portion of the bottom surface 106. The portion of the bottom surface 106 generally includes the location on the bottom surface 106 where the cable 104A is coupled to the housing 102. Similarly, the field of view cone 302B extends from camera module 300B at the second corner 107B of the bottom surface 106, and is aimed toward camera module 300A and the first corner 107A of the bottom surface 106. Thus, the image sensors in the camera module 300B can be used to generate image data that is reproducible as an image of at least a portion of the bottom surface 106. The portion of the bottom surface 106 again generally includes the location on the bottom surface 106 where the cable 104A is coupled to the housing 102. Together, the field of view cones 302A and 302B are configured to cover most of or all of the surface area of the bottom surface 106. Thus, the camera modules 300A and 300B, which are each coupled to the bottom surface 106 of the antenna array unit 100, can be used to monitor the bottom surface 106 of that same antenna array unit 100, and/or the cable 104A that is coupled to the bottom surface 106 of the antenna array unit 100.

The camera module 300C is coupled to the housing 102 near a first end 109A of the side surface 108, and is configured to monitor the side surface 128 of the housing 122 of the antenna array unit 120. The camera module 300C has a field of view represented by a field of view cone 302C. However, unlike the camera modules 300A and 300B, the field of view cone 302C is not aimed at the same surface to which the camera module 300C is coupled. Instead, the field of view cone 302C extends from the camera module 300C and is aimed at the side surface 128 of the housing 122 of the antenna array unit 120. In some implementations, the field of view of the camera module 300C extends from a first end 129A of the side surface 128, to a second end 129B of the side surface 128. In other implementations, the field of view of the camera module 300C covers less than the entire area of the side surface 128. For example, the field of view of the camera module 300C may include only a portion of the side surface 128, which could include the cable 124B. The image sensors in the camera module 300C can be used to generate image data that is reproducible as an image of at least a portion of the side surface 128, including the location on the side surface 128 where the cable 124B is coupled to the housing 122. Thus, the camera module 300C, which is coupled to the side surface 108 of the antenna array unit 100, can be used to monitor the side surface 128 of the other antenna array unit 120, and/or the cable 124B that is coupled to the side surface 128 of the antenna array unit 120.

The camera modules 320A, 320B, and 320C coupled to the antenna array unit 120 are arranged in a similar fashion as the camera modules 300A, 300B, and 300C of the antenna array unit 100. The camera module 320A is coupled to the housing 122 near a first corner 127A of the bottom surface 126, and the camera module 320B is coupled to the housing 122 near a second corner 127B of the bottom surface 106. In the illustrated implementation, the bottom surface 126 has a generally rectangular or square shape (similar to bottom surface 106), and the second corner 127B lies opposite the first corner 127A. The camera module 320C is coupled to the housing 122 near the first end 129A of the side surface 128, and is configured to monitor the side surface 108 of the housing 102 of the antenna array unit 100.

The field of view of the camera module 320A is represented by a field of view cone 322A. The field of view of the camera module 320B is represented by a field of view cone 322B. The field of view cone 322A extends from camera module 320A at the first corner 127A of the bottom surface 126, and is aimed toward the camera module 320B and the second corner 127B of the bottom surface 126. Similarly, the field of view cone 322B extends from the camera module 320B at the second corner 127B of the bottom surface 126, and is aimed toward the camera module 320A and the first corner 127A of the bottom surface 126. Thus, the image sensors in the camera modules 320A and 320B can be used to generate image data that is reproducible as images of at least a portion of the bottom surface 126. This portion of the bottom surface 126 generally includes the location on the bottom surface 126 where the cable 124A is coupled to the housing 122. Together, the field of view cones 322A and 322B are configured to cover most of or all of the surface area of the bottom surface 126 of the housing 122. Thus, the camera modules 320A and 320B, which are each coupled to the bottom surface 126 of the antenna array unit 120, can be used to monitor the bottom surface 126 of that same antenna array unit 120, and/or the cable 124A that is coupled to the bottom surface 126 of the antenna array unit 120.

The field of view of the camera module 320C is represented by a field of view cone 322C that extends from the camera module 320C, and is aimed at the side surface 108 of the housing 102 of the antenna array unit 100. In some implementations, the field of view of the camera module 320C extends from the first end 109A of the side surface 108 to a second end 109B of the side surface 108. In other implementations, the field of view of the camera module 320C covers less than the entire area of the side surface 108. For example, the field of view of the camera module 320C may include only a portion of the side surface 108, which could include the cable 104B. The image sensors in the camera module 320C can be used to generate image data that is reproducible as an image of at least a portion of the side surface 108, including the location on the side surface 108 where the cable 104B is coupled to the housing 102. Thus, the camera module 320C, which is coupled to the side surface 128 of the antenna array unit 120, can be used to monitor the side surface 108 of the other antenna array unit 100, and/or the cable 104B that is coupled to the side surface 108 of the antenna array unit 100.

It is also noted that the field of view cones 302A-302C and 322A-322C in FIG. 3 are not intended to exhaustively illustrate the entire field of view of the camera modules 300A-300C and 320A-320C, but instead are intended to illustrate the general direction in which the fields of view of the camera modules 300A-300C and 320A-320C are aimed. Further, in some implementations, different image sensors in the same camera module could have different fields of view. For example, the camera module 300C may include both a high-resolution image sensor and a thermal image sensor. The high-resolution image sensor could have a broad field of view that includes all of the side surface 128 of the housing 122 of the antenna array unit 120. The thermal image sensor could have a narrower field of view that is focused on a location along the side surface 128 where it is more expected that a fire or an elevated heat level could occur (such as the area on the side surface 128 where the cable 124B is coupled to the housing 122).

While the implementation illustrated in FIG. 3 includes three camera modules coupled to each of two antenna array units, any number of camera modules can be used to monitor any number of antenna array units of an antenna array, in any desired arrangement. In some implementations, one or more antenna array units can have at least one surface that is monitored by a single camera module coupled to that surface. For example, a single camera module could be used to monitor a surface of an antenna array to which that camera module is coupled to.

In other implementations, one or more antenna array units can have at least one surface that is monitored by multiple camera modules coupled to that surface. For example, multiple camera modules can be used to monitor a surface of an antenna array to which those camera modules are coupled to. The multiple camera modules could include as two camera modules (as illustrated in FIG. 3), or three or more camera modules.

In further implementations, a surface of an antenna array unit can be monitored by a single camera module that is coupled to a different antenna array unit. For example, a single camera module coupled to a first antenna array unit can be used to monitor a surface of a second antenna array unit. In even further implementations, a surface of an antenna array unit can be monitored by multiple camera modules that are coupled to one or more different antenna array units. For example, multiple camera modules coupled to a surface of a first antenna array unit can be used to monitor a surface of a second antenna array unit. In another example, one or more camera modules coupled to a first antenna array unit can be used to monitor a surface of a second antenna array unit, while one or more camera modules coupled to a third antenna array unit can also be used to monitor that same surface of the second antenna array unit.

In additional implementations, camera modules coupled to one antenna array unit can be used to monitor surfaces on two or more other antenna array units. For example, a first camera module and a second camera module can be coupled to a first antenna array unit. The first camera module can be used to monitor a surface of a second antenna array unit, and the second camera module can be used to monitor a surface of a third antenna array unit.

In the implementation illustrated in FIG. 3, only the bottom surface and one side surface of each antenna array unit 100 and 120 are monitored by camera modules. However, in other implementations, generally any surface of an antenna array unit can be monitored. The surfaces being monitored can include bottom surfaces, top surfaces, side surfaces, or any other surfaces. For example, if the antenna array unit has a spherical shape with one surface, that single surface can be monitored by one or more camera modules coupled to other antenna array units.

Further, while FIG. 3 illustrates the bottom surfaces 106 and 126 being monitored by camera modules attached to those bottom surfaces 106 and 126, in some implementations, the bottom surface of an antenna array unit could additionally or alternative be monitored by a camera module coupled to another antenna array unit. Similarly, while FIG. 3 illustrates the side surfaces 108 and 128 being monitored by camera modules attached to the opposite side surface 108 and 128, in some implementations, the side surface of an antenna array unit could additionally or alternative be monitored by a camera module coupled to the same side surface of the antenna array unit.

In some implementations, the position and/or orientation of the camera modules relative to the antenna array units can be customized to the antenna array unit being monitored. For example, an antenna array unit may have a shape that requires camera modules coupled to and monitoring the antenna array unit to be positioned at a specific angle relative to the housing of the antenna array unit, and/or at a specific distance away from the housing of the antenna array unit.

Figure 4:
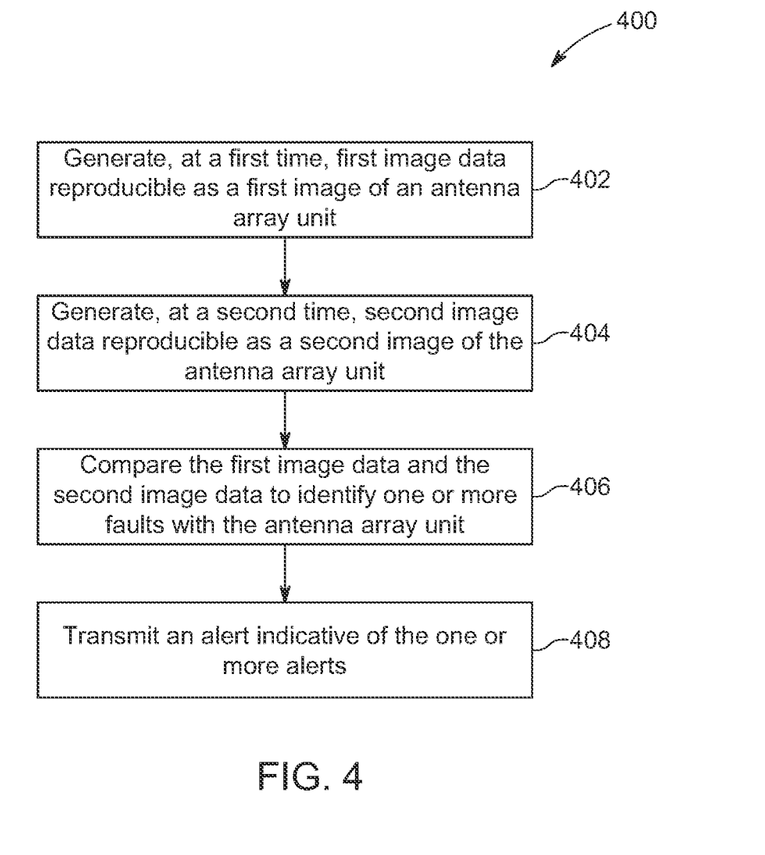
FIG. 4 is a flow diagram of a method of monitoring the antenna array of FIG. 1, according to certain aspects of the present disclosure.

FIG. 4 illustrates a flow diagram for a method 400 of monitoring an antenna array (such as the antenna array of the cell tower 10 in FIG. 1). In some implementations, a camera module (such as the camera module 200 in FIG. 2) can be used to monitor the antenna array. A control system (such as the control system 202 of the camera module 200) can be configured to carry out the various steps of the method 400. A memory device (such as the memory device 204 of the camera module 200) can be used to store any data associated with any of the steps of the method 400 (or other methods). Generally, each camera module that is configured to monitor an antenna array unit (or an area of an antenna array unit) can be configured to execute the method 400. For example, in the implementations illustrated in FIG. 3, each of the camera modules 300A-300C and 320A-320C can be configured to execute the method 400, in order to monitor the antenna array units 100 and 120.

The method 400 can be used to identify one or more faults that may be present with the antenna array unit. In one example, the fault can include the movement of the antenna array unit away from its intended position. The antennas within the antenna array unit are direction-specific, and are generally configured to transmit signals in a specific direction, and/or receive signals from that specific direction. The antenna array units thus each have a predetermined positioned and orientation to ensure proper operation of the antenna array. Any movement of an antenna array unit away from its intended position can cause the antennas within the antenna array unit to be oriented in the wrong direction, which in turn can disrupt the operation of the antenna array. The movement of the antenna array unit comprising the fault can include vertical movement of the antenna array unit, horizontal movement of the antenna array unit, rotation of the antenna array unit, other types of movement of the antenna array unit, or any combinations of different types of movement of the antenna array unit.

In another example, the fault can include physical damage to the antenna array unit, such as physical damage to the housing, physical damage to any cables coupled to the housing, physical damage to the individual antennas of the antenna array unit, physical damage to any other components of the antenna array unit (such as electronic components), or any combination thereof. Physical damage to the housing could include punctures (or any other kind of opening) formed in the housing. Physical damage to a cable can include the cable being torn or ripped (for example, a tear through the outer sheath of the cable that exposes inner components of the cable), the cable being severed (e.g., a portion of the cable is still physically coupled to the housing, but the cable has been cut so that components inside the housing are no longer electrically connected to components outside of the housing), the cable being disconnected from the housing, and other types of damage. Physical damage to any of the components of the antenna array unit can also include fire damage (e.g., scorch marks, burns in any cables coupled to the housing, etc.), water damage, electrical damage (caused, for example, by lightning strikes or other electrical surges), or any other type of physical damage.

In a further example, the fault can include elevated heat levels at the antenna array unit. Elevated heat levels can be indicative of an electrical malfunction, an impending or current fire, etc. In yet another example, the fault can include the presence of an animal near the antenna array unit. The presence of the animal can include an animal (such as a bird, an insect colony, etc.) being physically located at or near the antenna array unit. The presence of an animal can also include the presence of an animal's dwelling (such as a bird's nest, an insect hive, etc.) being physically located at or near the antenna array unit.

Step 402 of the method 400 includes generating at a first time, first image data that is reproducible as a first image (or images) of the antenna array unit. The first image data can be generated using one or more image sensors in the camera module, such as the high-resolution camera 208 and/or the thermal camera 210 of the camera module 200. The area of the antenna array unit being monitored by the camera module is generally within the field of view of the one or more image sensors of the camera module, so that the first image (or images) of the antenna array unit will visually show the monitored area. In some implementations of the method 400, the monitored area of the antenna array unit includes a location of the antenna array unit where a cable is coupled to the housing of the antenna array unit, as discussed herein with respect to FIG. 3. Further, the antenna array unit being monitored may be the same antenna array unit to which the camera module is coupled, or may be a different antenna array unit then the antenna array unit to which the camera module is coupled.

In some implementations, step 402 is preceded by a calibration step. In this step, the camera module is initially coupled to an antenna array unit (which may or may not be the antenna array unit being monitored by the camera module), and calibrated to ensure that the camera module is functioning correctly. For example, the calibration step can be used to ensure that the field of view of the camera module is aimed properly, and that any image data generated by the image sensors of the camera module can be used to produced accurate images of the area of the antenna array unit being monitored.

In some implementations, the first image data generated at step 402 is generated immediately after the camera module is initially coupled to the antenna array unit and calibrated. The first image data can thus be used to show the antenna array unit when there are no faults with the antenna array unit. In other implementations, the first image data generated at step 402 is generated at some time after the camera module is initially coupled to the antenna array unit and calibrated, but is generated at a time when it is known that there are no faults with the antenna array unit.

Step 404 of the method 400 includes generating at a second time, second image data that is reproducible as a second image (or images) of the antenna array unit. Similar to the first image data generated at step 402, the second image data can be generated using the one or more image sensors in the camera module, which can include the high-resolution camera and/or the thermal camera.

Step 406 of the method 400 includes comparing the first image data and the second image data and identifying one or more faults with the antenna array unit, based on this comparison. The first image data can thus serve as reference image data or initial image data. In some implementations, comparing the first image data and the second image data can include generating a first image of the antenna array unit from the first image data, generating a second image of the antenna array unit from the second image data, and then identifying differences between the first image and the second image. Any differences between the first image and the second image can be indicative of the presence of a fault with the antenna array unit. For example, the second image may show that a cable has moved or has been damaged, or that a bird's nest is present on the antenna array unit.

In some implementations, object recognition can be used to aid in determining any differences between the first image and the second image. For example, object recognition can be used to identify specific items within the images. The specific items could include cables, any identifiable features on the housing (such as a handle, hinges, etc.), animals, animal dwellings, etc. If an object is identified in the second image but not the first image, the second image can be flagged as having a difference that may indicate the presence of a fault. Alternatively, if an object is identified in both the first image and the second image, but has somehow changed in the second image (e.g., moved positions, changed in size), the second image can be flagged as having a difference that may indicate the presence of a fault. In some implementations, the control system of the camera module can be trained using a machine learning algorithm to identify various different objects that could appear in the images (e.g., cables, animals, animal dwellings, evidence of physical damage).

In some implementations, identifying differences between the first image and the second image includes comparing each pixel in the second image with a corresponding pixel in the first image. The first image and the second image are each formed from a plurality of pixels. Because the first image and the second image are both produced from the same image sensors, the two images will generally have the same number of pixels, and each pixel in the second image will correspond to one of the pixels in the first image. The pixels can be compared to determine a percentage of the pixels in the second image that are different from their corresponding pixel in the first image. In some implementations, a pixel in the second image is considered to be different from its corresponding pixel in the first image only if the two pixels have different color values. In other implementations, a pixel in the second image is considered to be different from its corresponding pixel in the first image only if the two pixels have a different intensity values. In further implementations, a pixel in the second image is considered to be different from its corresponding pixel in the first image if the two pixels have different color values or different intensity values.

If the percentage of pixels that are different in the second image satisfies a threshold percentage, the first and second images can be analyzed to identify the actual differences in the images, in order to determine the fault in the antenna array unit. By comparing the percentage of different pixels to the threshold percentage, minor differences that are not the result of a fault with the antenna array unit can be ignored. For example, the cables coupled to the housing of the antenna array unit generally have some amount of slack, and can inadvertently move (for example due to wind, rain, etc.). However, small differences in the position of the cables due to natural phenomena such as weather are generally not indicative of any faults with the antenna array unit and can be ignored.

In some implementations, the threshold percentage is a threshold percentage of different pixels, and defines the maximum number of different pixels in a second image that does not trigger the analysis of the second image. In other implementations, the threshold percentage is a threshold percentage of same pixels, defines the minimum number of same pixels in a second image that does not trigger the analysis of the second image. A given threshold percentage of different pixels can be converted to a threshold percentage of the same pixels by taking 100% minus the threshold percentage of different pixels. Similarly, a given threshold percentage of the same pixels can be converted to a threshold percentage of the different pixels by taking 100% minus the threshold percentage of the same pixels.

If a threshold percentage of different pixels is used, the full analysis is triggered if either the percentage of different pixels is greater than (or equal to in some cases) the threshold percentage, or if the percentage of the same pixels is less than (or equal to in some cases) 100% minus the threshold percentage. For example, if the threshold percentage of different pixels is 60%, a second image with 55% different pixels would not trigger the analysis of the second image, whereas a second image with 65% different pixels would trigger the analysis of the second image.

If a threshold percentage of the same pixels is used, the full analysis is triggered if either the percentage of the same pixels is less than (or equal to in some cases) the threshold percentage, or if the percentage of different pixels is greater than (or equal to in some cases) 100% minus the threshold percentage. For example, if the threshold percentage of the same pixels is 60%, a second image with 55% of the same pixels would trigger the analysis of the second image, whereas a second image with 65% of the same pixels would not trigger the analysis of the second image.

The various threshold percentages disclosed herein generally refer to the threshold percentage of different pixels (e.g., the maximum number of different pixels in a second image that does not trigger the analysis of the second image). A number of different pixels greater than threshold percentage (or equal to the threshold percentage in some cases) will satisfy the threshold percentage and trigger the full analysis of the second image. However, any of these threshold percentages of different pixels can also be converted to threshold percentages of the same pixels.

In any implementation, if the total number of pixels in the image is $P_{TOT}$, the number of pixels in the image that are different from the first image to the second image is $P_{DIFF}$, and the number of pixels in the image that are the same from the first image to the second image is $P_{SAME}$, then percentage of pixels in the second image that are the same is $P_{SAME}\% = P_{SAME}/P_{TOT} = (P_{TOT} - P_{DIFF})/P_{TOT}$, and the percentage of pixels in the second image that are different is $P_{DIFF} = P_{DIFF}/P_{TOT} = (P_{TOT} - P_{SAME})/P_{TOT}$. In any implementation, if the number of different pixels or same pixels is exactly equal to the threshold percentage, that can be considered to satisfy the threshold percentage or not satisfy the threshold percentage.

The threshold percentage can vary based on different situations. For example, if determining whether there is a bird's nest (or other animal dwelling) near the antenna array unit, the percentage of different pixels required to trigger the full analysis may be small, since a bird's nest will likely not result in very many different pixels. In this example, the threshold percentage of different pixels can be between about 1% and about 5% (e.g., if the percentage of different pixels is greater than about 1%-5%, the analysis of the second image is triggered). In another example, the threshold percentage for a fire can be between about 10% and about 20%. In a further example, the threshold percentage for any type of shaking or shifting is between about 80% or about 90%.

In some implementations, the pixels in every second image are analyzed for every type of fault. For example, if the percentage of different pixels satisfies the threshold percentage for any of the faults, the fuller analysis of the second image is triggered. In other implementations, a given second image may only be analyzed for a certain type of fault, and the fuller analysis is triggered only if the percentage of different pixels satisfies the threshold percentage for that specific fault.

In some implementations, the threshold percentages can include a time-based component. For example, an antenna array unit that has shifted may result in the same number of different pixels as compared to an antenna array unit that is shaking when the images are captured. However, the percentage of different pixels in a shifted antenna array unit will generally be sustained over a longer time period. The percentage of different pixels in a shaking antenna array unit may occasionally satisfy the threshold percentage for a given second image, but overall will usually not satisfy the threshold percentage. Thus, to identify a shifting fault, the threshold percentage may incorporate a time requirement as well. For example, the threshold percentage may need to be satisfied for a certain number of second images until the fuller analysis is triggered. In another example, the threshold percentage may need to be satisfied for a number of second images that span a required time period (e.g., 6 hours, 1 day, etc.) until the fuller analysis is triggered.

Thus, the threshold percentage of different pixels that defines the maximum allowed number of different pixels before the fuller analysis is triggered can vary in different implementations. In some of these implementations, the threshold percentage is about 50%; between about 40% and about 60%; between about 50% and about 70; between about 30% and about 50%; between about 30% and about 70%; between about 1% and about 5%; between about 10% and about 20%; between about 80% and about 90%; or any combination thereof (such as between about 1% and about 5%, between about 10% and about 20%, and between about 90% and about 90%).

If the threshold percentage is not satisfied, the second image can be discarded. In some cases, even if the threshold percentage is satisfied, the differences between the first image and the second image do not indicate the presence of any faults with the antenna array unit. In these cases, the second image can also be discarded, despite the threshold percentage being satisfied.

Finally, at step 408 of the method 400, an alert can be transmitted that is indicative of the fault with the antenna array unit, in response to the identified differences between the first image and the second image indicating the presence of at least one fault with the antenna array unit. The alert can be transmitted using a communications interface of the camera module (such as the communications interface 206 of the camera module 200 in FIG. 2). In some implementations, the alert can be transmitted to a monitoring entity, which may be a person, a group of people, a company, or another entity that is responsible for monitoring and/or maintaining the antenna arrays. The alert will generally indicate that there is at least one fault with the antenna array unit, and will also include information about the specific type of fault. In some implementations, the alert will also include identification information that identifies the specific antenna array unit with the fault, so that the monitoring entity knows which antenna array requires maintenance and/or replacement. The identification information can include, for example, a unique identifier that identifies the antenna array unit (such as an ID number), etc. In some implementations, the identification information also includes location information, such as GPS coordinates of the antenna array unit that have been generated by a GPS module (such as the GPS module 212 of the camera module 200).

In some implementations, method 400 can include periodically generating image data using the image sensors of the camera module, and then comparing the image data to the first image to determine if there is a fault with the antenna array unit. Thus, if the comparison between the first image data and the second image data does not indicate that there is a fault with the antenna array unit, third image data can be generated at a third time. The third image data can then be compared to the first image data to determine if there is a fault with the antenna array unit at the third time. The time period between successive images (e.g., the time between the first time and the second, and the time between the second time and the third time) can generally be any suitable time period. The time period can be 30 seconds, 1 minute, 5 minutes, 10 minutes, 30 minutes, 1 hour, 2 hours, 6 hours, 12 hours, 1 day, or any other time period. Thus, if the analysis of any given image data does not indicate a fault with the antenna array unit at the time when the image data was generated, that image data can be ignored, and later-produced image data can be analyzed to determine if there is a fault with the antenna array unit at a later time.

In some implementations, the reference image data is the first image data that is generated when the camera module is initially coupled to the antenna array unit and calibrated (or when it is known that no faults exist with the antenna array unit). In other implementations, the reference image data is image data that is generated after the first image data, but still at a time when it was known that no faults existed with the antenna array unit.

In some implementations, the comparison of the first image data and the second image data (or the comparison between the first image data and any subsequently-generated image data) can include comparing multiple images from the first time and multiple images from the second time. For example, the first image data and the second image data may both include data generated by a high-resolution camera, and a thermal camera. The image data from the high-resolution camera can be used to produce a first high-resolution image and a second high-resolution image, which can be compared. However, the image data from the thermal camera can be used to a first thermal image (separate from the first high-resolution image) and a second thermal image (separate from the second high-resolution image), which can then be compared. If either of the comparisons indicate that a fault is present with the antenna array unit, the alert can be transmitted.

Comparing the image data from different image sensors separately can thus be used to identify faults using one type of image data, where a different type of image data my not reveal the fault. For example, if an antenna array unit is experiencing an elevated heat level, a comparison between two high-resolution images may not indicate the presence of a fault if the elevated heat level has not have caused any visible changes to the antenna array unit. However, a comparison between two thermal images will generally reveal the presence of the elevated heat level, so that the fault can be identified and the alert transmitted to the monitoring entity.

In some implementations, the method 400 can further include a variety of different steps to mitigate the identified fault. For example, a fire suppression system could be mounted near the antenna array on the cell tower. If the analysis in the method 400 results in determining that there is an activate fire at the antenna array unit, the fire suppression system could be activated to aid in putting out the fire. In another example, the antenna array could include a mechanism designed to remove the presence of the animal. The mechanism could include an audible alarm that can be activated to attempt to scare away any animals (such as birds). The mechanism could also include some type of physical intervention that can be activated to remove an animal dwelling (such as a bird's nest or an insect hive).

Generally, the method 400 can be implemented using a system or device (such as a camera module) having a control system with one or more processors, and a memory device storing machine readable instructions. The control system can be coupled to the memory, and the method 400 can be implemented when the machine readable instructions are executed by at least one of the processors of the control system. The method 400 can also be implemented using a computer program product (such as a non-transitory computer readable medium) comprising instructions that when executed by a computer, cause the computer to carry out the steps of method 400. In general, the method 400 can be implemented by each of one or more camera modules that are deployed to monitor the antenna array units of an antenna array.

Although the disclosed implementations have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various implementations of the present disclosure have been described above, it should be understood that they have been presented by way of example only, and not limitation. Numerous changes to the disclosed implementations can be made in accordance with the disclosure herein, without departing from the spirit or scope of the disclosure. Thus, the breadth and scope of the present disclosure should not be limited by any of the above described implementations. Rather, the scope of the disclosure should be defined in accordance with the following claims and their equivalents.

What is claimed is:

1. A system for monitoring an antenna array, the system comprising:
   a first camera module configured to be coupled to a first end of a surface of an antenna array unit, such that a second opposing end of the surface of the antenna array unit is within a field of view of the first camera module; and
   a second camera module configured to be coupled to the second end of the surface of the antenna array unit, such that the first end of the surface of the antenna array unit is within a field of view of the second camera module,
   the first camera module and the second camera module each including:
      one or more image sensors;
      a communications interface;
      a memory device having stored thereon machine-readable instructions; and
      a control system including one or more processors configured to execute the machine-readable instructions,
   wherein the control system of the first camera module is configured to execute the machine-readable instructions to:
      compare a first image of the second end of the surface of the antenna array unit obtained at the first time, and a second image of the second end of the surface of the antenna array unit obtained at a second time after the first time; and
      transmit a first alert in response to the comparing indicating a presence of at least one fault with the antenna array unit at the second time, and
   wherein the control system of the second camera module is configured to execute the machine-readable instructions to:
      compare a first image of the first end of the surface of the antenna array unit obtained at the first time, and a second image of the first end of the surface of the antenna array unit obtained at the second time; and
      transmit a second alert in response to the comparing indicating the presence of the at least one fault with the antenna array unit at the second time.

2. The method of claim 1, wherein the at least one fault includes movement of the antenna array unit away from a desired location, physical damage to the antenna array unit, an elevated heat level at the antenna array unit, a presence of an animal near the antenna array unit, or any combination thereof.

3. The method of claim 2, wherein the movement of the antenna array unit includes vertical movement of the antenna array unit, horizontal movement of the antenna array unit, rotational movement of the antenna array unit, or any combination thereof.

4. The method of claim 2, wherein the antenna array unit includes a housing, one or more antennas disposed at least partially within the housing, and one or more cables coupled to the housing, and wherein the physical damage to the antenna array unit includes physical damage to the housing of the antenna array unit, physical damage to the one or more cables, or both.

5. The method of claim 4, wherein the physical damage to the antenna array unit includes a puncture in the housing of the antenna array unit, a puncture in at least one of the one or more cables, a severing of at least one of the one or more cables, a disconnection of at least one of the one or more cables from the housing, fire damage to the housing, fire damage to at least one of the one or more cables, or any combination thereof.

6. The method of claim 2, wherein the elevated heat level at the antenna array unit is indicative of a fire at the antenna array unit.

7. The system of claim 1, wherein the one or more image sensors of each of the first camera module and the second camera module includes a thermal camera, a non-thermal camera, or both.

8. The system of claim 1, wherein a difference in time between the first time and the second time is 30 seconds, 1 minute, 5 minutes, 10 minutes, 30 minutes, 1 hour, 2 hours, 6 hours, 12 hours, or 1 day.

9. A system for monitoring an antenna array that includes a first antenna array unit and a second antenna array unit, the system comprising:
   a first camera module configured to be coupled to a first surface of the first antenna array unit such that a first surface of the second antenna array unit is within a field of view of the first camera module; and
   a second camera module configured to be coupled to a second surface of the first antenna array such that the second surface of the first antenna array unit is within a field of view of the second camera module,
   wherein the first camera module and the second camera module each include:
      one or more image sensors;
      a communications interface;
      a memory device having stored thereon machine-readable instructions; and
      a control system including one or more processors configured to execute the machine-readable instructions,
   wherein the control system of the first camera module is configured to execute the machine-readable instructions to:
      compare a first image of the first surface of the second antenna array unit obtained at a first time, and a second image of the first surface of the second antenna array unit obtained at a second time after the first time; and
      transmit a first alert in response to the comparing indicating a presence of at least one fault with the second antenna array unit at the second time, and
   wherein the control system of the second camera module is configured to execute the machine-readable instructions to:
      compare a first image of the second surface of the first antenna array unit obtained at the first time and a second image of the second surface of the first antenna array unit obtained at the second time after the first time; and
      transmit a second alert in response to the comparing indicating a presence of at least one fault with the first antenna array unit at the second time.

10. The system of claim 9, wherein:
   the first surface of the first antenna array unit is a side surface;
   the second surface of the first antenna array unit is a top surface or a bottom surface; and
   the first surface of the second antenna array unit is a side surface facing toward the side surface of the first antenna array unit.

11. The method of claim 10, wherein the at least one fault includes movement of the first antenna array unit or the second antenna array unit away from a desired location, physical damage to the first antenna array unit or the second antenna array unit, an elevated heat level at the first antenna array unit or the second antenna array unit, a presence of an animal near the first antenna array unit or the second antenna array unit, or any combination thereof.

12. The method of claim 11, wherein the movement of the first antenna array unit or the second antenna array unit includes vertical movement of the first antenna array unit or the second antenna array unit, horizontal movement of the first antenna array unit or the second antenna array unit, rotational movement of the first antenna array unit or the second antenna array unit, or any combination thereof.

13. The method of claim 11, wherein the first antenna array unit and the second antenna array unit each include a housing, one or more antennas disposed at least partially within the housing, and one or more cables coupled to the housing, and wherein the physical damage to the first antenna array unit or the second antenna array unit includes physical damage to the housing of the first antenna array unit or the second antenna array unit, physical damage to the one or more cables of the first antenna array unit or the second antenna array unit, or both.

14. The method of claim 13, wherein the physical damage to the first antenna array unit or the second antenna array unit includes a puncture in the housing of the first antenna array unit or the second antenna array unit, a puncture in at least one of the one or more cables of the first antenna array unit or the second antenna array unit, a severing of at least one of the one or more cables of the first antenna array unit or the second antenna array unit, a disconnection of at least one of the one or more cables from the housing of the first antenna array unit or the second antenna array unit, fire damage to the housing of the first antenna array unit or the second antenna array unit, fire damage to at least one of the one or more cables of the first antenna array unit or the second antenna array unit, or any combination thereof.

15. The method of claim 11, wherein the elevated heat level at the first antenna array unit or the second antenna array unit is indicative of a fire at the first antenna array unit or the second antenna array unit.

16. The system of claim 9, wherein the one or more image sensors of each of the first camera module and the second camera module includes a thermal camera, a non-thermal camera, or both.

17. The system of claim 9, wherein a difference in time between the first time and the second time is 30 seconds, 1 minute, 5 minutes, 10 minutes, 30 minutes, 1 hour, 2 hours, 6 hours, 12 hours, or 1 day.

* * * * *